(12) United States Patent
Batman et al.

(10) Patent No.: US 8,464,659 B1
(45) Date of Patent: Jun. 18, 2013

(54) PET ACCOMMODATING SYSTEM

(76) Inventors: Henry M. Batman, Tarpon Springs, FL (US); Carlene R. Batman, Tarpon Springs, FL (US)

( * ) Notice: Subject to any disclaimer, the term of this patent is extended or adjusted under 35 U.S.C. 154(b) by 217 days.

(21) Appl. No.: 12/932,629

(22) Filed: Mar. 2, 2011

Related U.S. Application Data

(63) Continuation-in-part of application No. 12/079,040, filed on Mar. 24, 2008, now abandoned.

(51) Int. Cl.
*A01K 5/01* (2006.01)

(52) U.S. Cl.
USPC ..................... 119/61.56; 119/61.57

(58) Field of Classification Search
USPC ............... 119/61.5, 61.56, 61.57; 294/15, 294/27.1, 209; 220/756, 755, 771, 752, 741, 220/751; D30/133
See application file for complete search history.

(56) References Cited

U.S. PATENT DOCUMENTS

| | | | | |
|---|---|---|---|---|
| 2,606,054 A * | 8/1952 | Cole | | 294/15 |
| 2,801,609 A * | 8/1957 | Webster | | 119/51.03 |
| D213,378 S * | 2/1969 | Robert | | D30/133 |
| 4,976,223 A * | 12/1990 | Pierce | | 119/61.56 |
| D357,557 S * | 4/1995 | Piper | | D30/133 |
| 5,501,176 A * | 3/1996 | Tully | | 119/61.57 |
| 5,887,545 A * | 3/1999 | Cuttress | | 119/61.56 |
| 6,382,691 B2 * | 5/2002 | Hazelton | | 294/31.2 |
| 6,681,719 B1 * | 1/2004 | Warner | | 119/61.56 |
| 7,073,461 B2 * | 7/2006 | Gonet | | 119/61.5 |
| 7,107,930 B2 * | 9/2006 | Axelrod | | 119/51.01 |
| D623,362 S * | 9/2010 | Man | | D30/133 |
| D627,109 S * | 11/2010 | Man | | D30/133 |
| 7,987,816 B1 * | 8/2011 | Walsh | | 119/61.56 |
| D670,452 S * | 11/2012 | Caruso | | D30/133 |
| 2005/0126502 A1 * | 6/2005 | Leary | | 119/61.56 |
| 2005/0248165 A1 * | 11/2005 | Sharon | | 294/27.1 |
| 2006/0283397 A1 * | 12/2006 | Loeffelholz | | 119/61.56 |
| 2007/0074669 A1 * | 4/2007 | Montague | | 119/61.56 |
| 2009/0107406 A1 * | 4/2009 | Penny | | 119/51.5 |

\* cited by examiner

*Primary Examiner* — Son T Nguyen
*Assistant Examiner* — Kathleen Iwasaki

(57) ABSTRACT

A support plate has upper and lower surfaces, rear and front edges and opposed side edges. A front wall is upturned at the front edge. Opposed side walls are upturned at the side edges. A rear wall is upturned at the rear edge. The support plate has arcuate cut out sections. The cut out sections extend from an end of the front wall to an adjacent side wall. A tube assembly includes a hollow vertical tube. The vertical tube has a lower end and an upper end. The tube assembly also includes a horizontal tube with an interior end permanently attached to the upper end of the vertical tube. The horizontal tube also has a free exterior end. The horizontal tube is positioned to overlie the support plate. The exterior end is positioned closer to the front edge than to the rear edge.

3 Claims, 2 Drawing Sheets

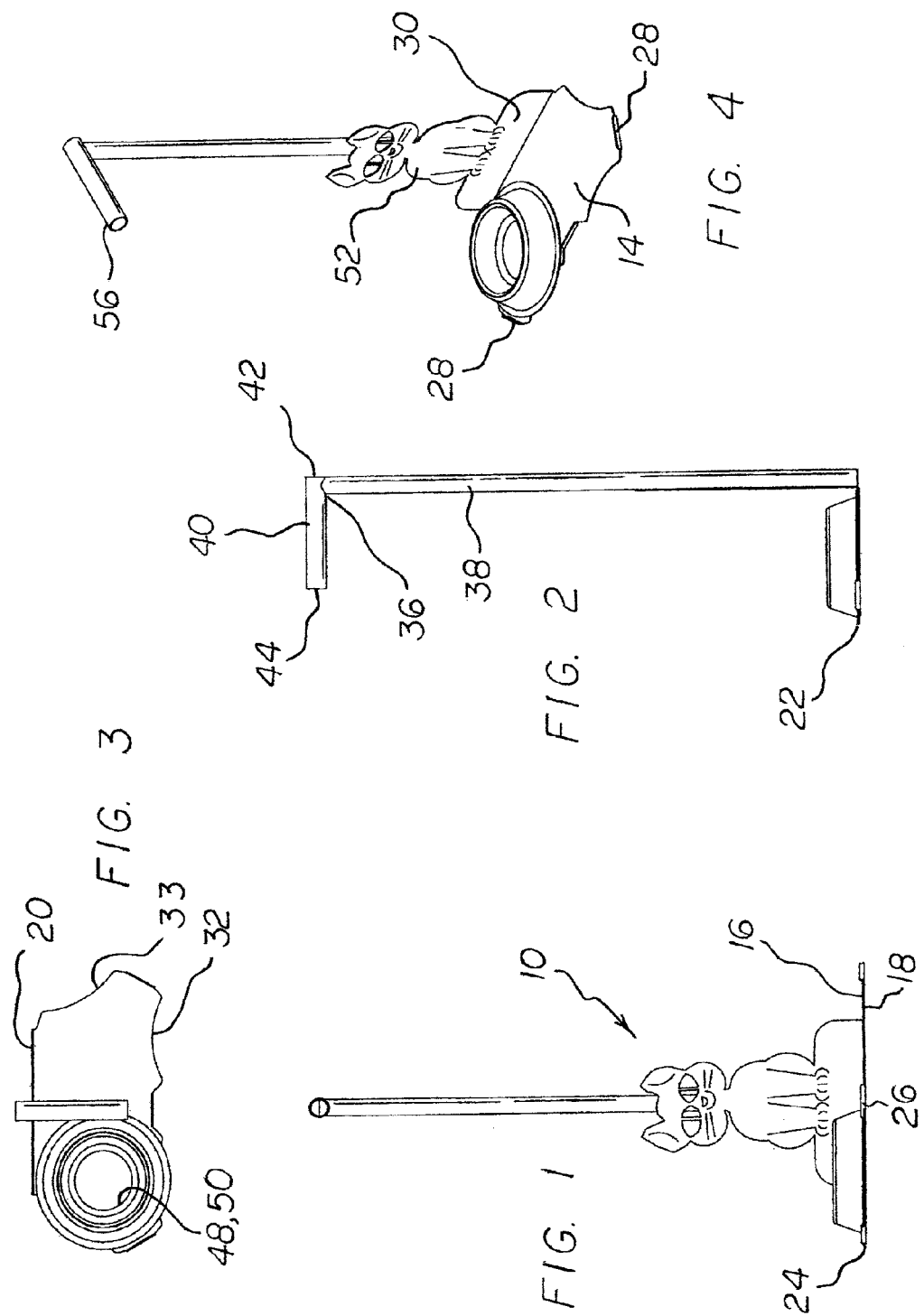

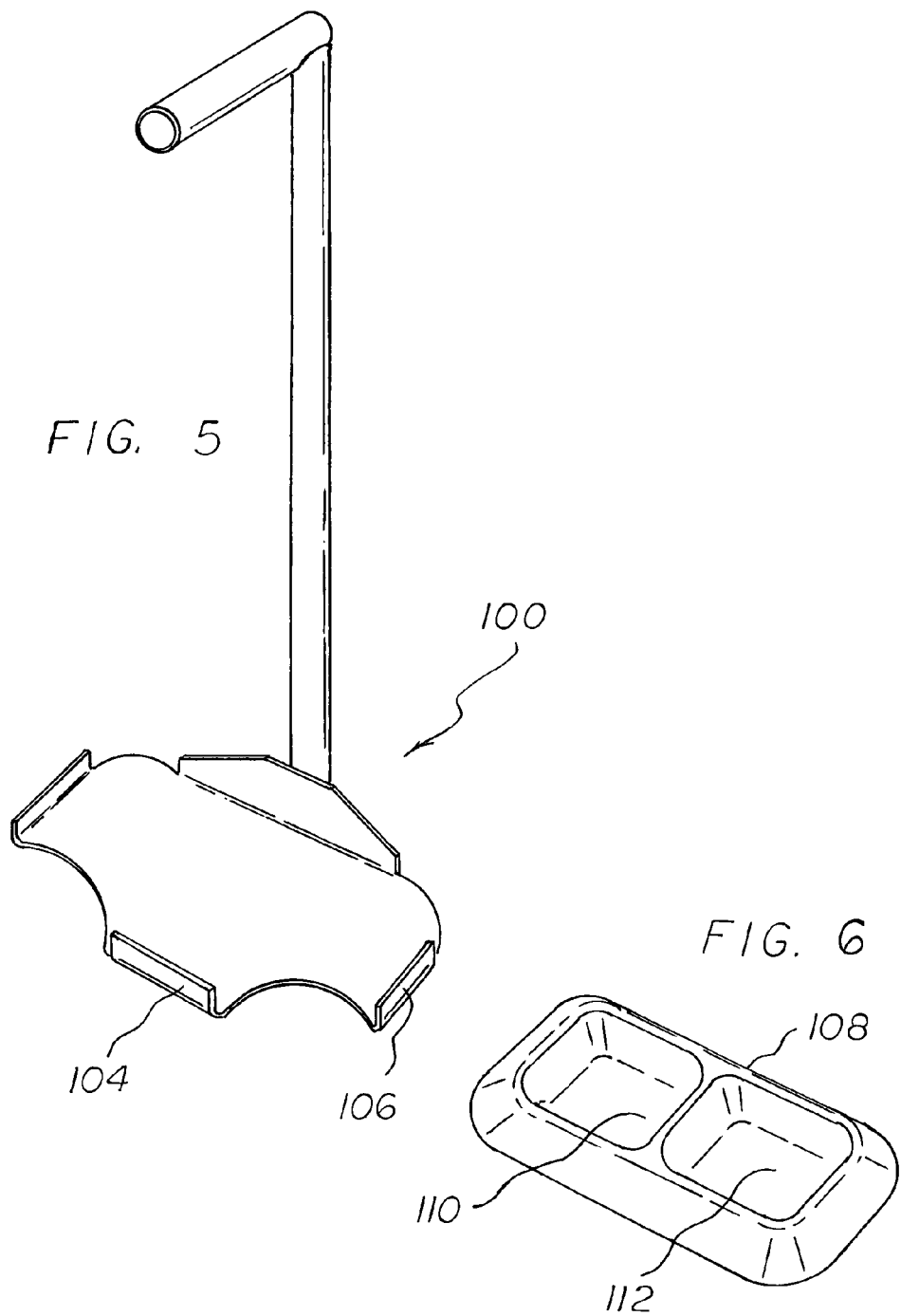

PET ACCOMMODATING SYSTEM

RELATED APPLICATION

The present application is a continuation-in-part application of U.S. patent application Ser. No. 12/079,040 filed Mar. 24, 2008 now abandoned, the subject matter of which is incorporated herein by reference.

BACKGROUND OF THE INVENTION

1. Field of the Invention

The present invention relates to a pet accommodating system and more particularly pertains to allowing people with reduced physical capabilities to provide food and water to a pet in a safe, convenient and economical manner.

2. Description of the Prior Art

The use of pet feeding systems of known designs and configurations is known in the prior art. More specifically, pet feeding systems of known designs and configurations previously devised and utilized for the purpose of feeding pets through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 2,584,301 issued Feb. 5, 1951 to Sinclair relates to a Moated Dog Feeder. U.S. Pat. No. 4,254,979 issued Mar. 1, 1981 to Bau related to a Scoop Device. Lastly, U.S. Pat. No. 5,887,545 issued Mar. 30, 1999 to Cuttress relates to a Pet Dish, Kit and Method of Assembling.

While these devices fulfill their respective, particular objectives and requirements, the aforementioned patents do not describe a pet accommodating system that allows for allowing people with reduced physical capabilities to provide food and water to a pet in a safe, convenient and economical manner.

In this respect, the pet accommodating system according to the present invention substantially departs from the conventional concepts and designs of the prior art, and in doing so provides an apparatus primarily developed for the purpose of allowing people with reduced physical capabilities to provide food and water to a pet in a safe, reliable, convenient and economical manner.

Therefore, it can be appreciated that there exists a continuing need for a new and improved pet accommodating system which can be used for allowing people with reduced physical capabilities to provide food and water to a pet in a safe, convenient and economical manner. In this regard, the present invention substantially fulfills this need.

SUMMARY OF THE INVENTION

In view of the foregoing disadvantages inherent in the known types of pet feeding systems of known designs and configurations now present in the prior art, the present invention provides an improved pet accommodating system. As such, the general purpose of the present invention, which will be described subsequently in greater detail, is to provide a new and improved pet accommodating system and method which has all the advantages of the prior art and none of the disadvantages.

To attain this, the present invention essentially comprises a pet accommodating system. First provided is a support plate. The support plate is in a generally planar configuration. The support plate has an upper surface. The support plate has a lower surface. The support plate has a rear edge. The support plate has a front edge. The rear and front edges are separated by a depth. The support plate has opposed side edges. The side edges are separated by a width. The front and side edges are in a curved configuration. The maximum depth is between 40 and 60 percent of the maximum width. The support plate has a front wall. The front wall is upturned at a central extent of the front edge. The front wall has a width between 23 and 43 percent of the width of the support plate. The support plate has opposed side walls. The side walls are upturned at each side edge. Each side wall has a depth between 23 and 43 percent of the maximum depth of the support plate. The support plate has a rear wall. The rear wall is upturned at a central extent of the rear edge. The rear wall has a width between 57 and 77 percent of the width of the support plate. The lower surface is positionable on a recipient surface. The upper surface is adapted to receive and support removable components. The support plate has two similarly configured front arcuate cut out sections and two similarly configured rear arcuate cut out sections. Each forward cut out section is concave and extends from an end of the front wall to an adjacent side wall. Each rearward cut out section is concave and extends from an end of the rear wall to an adjacent side wall. Each cut out section has a radius of curvature equal to between 28 and 38 percent of the maximum depth. The cut out section is adapted to facilitate the handling of the bowls when placing them on and removing them from the support plate.

A tube assembly is provided. The tube assembly includes a hollow vertical tube. The vertical tube has a lower end. The vertical tube has an upper end. The upper and lower edges are spaced by a height of between 2 feet and 4 feet. The tube assembly also includes a horizontal tube. The horizontal tube has an interior end. The interior end of the horizontal tube is permanently attached to the upper end of the vertical tube. The horizontal tube has a free exterior end. The interior end and the exterior end of the horizontal tube are spaced by a distance of between 6 inches and 12 inches. In this manner a handle is formed. The horizontal tube is positioned to overlie the support plate. The interior end is positioned provided above the rear edge. The free exterior end is positioned closer to the front edge than the rear edge. The positioning of the horizontal tube is correlated with respect to the support plate. In this manner balance and optimized handling are provided when listing the system.

Provided next is a pair of similarly configured circular bowls. The pair of bowls include a first bowl. The first bowl is adapted to hold water. The pair of bowls includes a second bowl. The second bowl is adapted to hold food. Each bowl is removably positioned on the upper surface of the support plate. Each bowl is provided in contact with the front wall and the rear wall and one of the side walls.

Further provided is a designer plate. The designer plate extends upwardly from the rear wall and in contact with a portion of the vertical tube. The designer plate has peripheral contours and artistic markings. The designer plate is adapted to simulate the appearance of an animal. The animal is adapted to eat and drink from the system.

Provided last is an elastomeric grip. The grip is removably positioned on the horizontal tube. In this manner the handling of the tube assembly and the system by a user is facilitated.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pet accommodating system which has all of the advantages of the prior art pet feeding systems of known designs and configurations and none of the disadvantages.

It is another object of the present invention to provide a new and improved pet accommodating system which may be easily and efficiently manufactured and marketed.

It is further object of the present invention to provide a new and improved pet accommodating system which is of durable and reliable constructions.

An even further object of the present invention is to provide a new and improved pet accommodating system which is susceptible of a low cost of manufacture with regard to both materials and labor, and which accordingly is then susceptible of low prices of sale to the consuming public, thereby making such pet accommodating system economically available to the buying public.

Even still another object of the present invention is to provide a pet accommodating system for allowing people with reduced physical capabilities to provide food and water to a pet in a safe, convenient and economical manner.

Lastly, it is an object of the present invention to provide a new and improved pet accommodating system. A support plate has upper and lower surfaces, rear and front edges and opposed side edges. A front wall is upturned at the front edge. Opposed side walls are upturned at the side edges. A rear wall is upturned at the rear edge. The support plate has arcuate cut out sections. The cut out sections extend from an end of the front wall to an adjacent side wall. A tube assembly includes a hollow vertical tube. The vertical tube has a lower end and an upper end. The tube assembly also includes a horizontal tube with an interior end permanently attached to the upper end of the vertical tube. The horizontal tube also has a free exterior end. The horizontal tube is positioned to overlie the support plate. The exterior end is positioned closer to the front edge than to the rear edge.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 1, 2 and 3 are a front elevational view and a side elevational view and a plan view of a pet accommodating system constructed in accordance with the principles of the present invention.

FIG. 4 is a perspective illustration of the system of the prior Figures.

FIG. 5 is a perspective illustration of an alternate embodiment of the invention but with the bowls removed.

FIG. 6 is a perspective illustration of a rectangular bowl with two square sections, one for food and one for water.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved pet accommodating system embodying the principles and concepts of the present invention and generally designated by the reference numeral 10 will be described.

The present invention, the pet accommodating system 10 is comprised of a plurality of components. Such components in their broadest context include a support plate and a tube assembly. Such components are individually configured and correlated with respect to each other so as to attain the desired objective.

First provided is a support plate 14. The support plate is in a generally planar configuration. The support plate has an upper surface 16. The support plate has a lower surface 18. The support plate has a rear edge 20. The support plate has a front edge 22. The rear and front edges are separated by a depth. The support plate has opposed side edges 24. The side edges are separated by a width. The front and side edges are in a curved configuration. The maximum depth is between 40 and 60 percent of the maximum width. The support plate has a front wall 26. The front wall is upturned at a central extent of the front edge. The front wall has a width between 23 and 43 percent of the width of the support plate. The support plate has opposed side walls 28. The side walls are upturned at each side edge. Each side wall has a depth between 23 and 43 percent of the maximum depth of the support plate. The support plate has a rear wall 30. The rear wall is upturned at a central extent of the rear edge. The rear wall has a width between 57 and 77 percent of the width of the support plate. The lower surface is positionable on a recipient surface. The upper surface is adapted to receive and support removable components.

The support plate has two similarly configured arcuate forward cut out sections 32 and two similarly configured arcuate rearward cut out sections 33. Each cut out section is concave. Each forward cut out section extends from an end of the front wall to an adjacent side wall. Each rearward cut out section extends from an end of the rear wall to an adjacent side wall. Each cut out section has a radius of curvature equal to between 28 and 38 percent of the maximum depth. The cut out sections are adapted to facilitate the handling of the bowls when placing them on and removing them from the support plate. Having forward and rearward cut out sections facilitates grasping a bowl from either the front or the back of the system.

A tube assembly 36 is provided. The tube assembly includes a hollow vertical tube 38. The vertical tube has a lower end. The vertical tube has an upper end. The upper and lower edges are spaced by a height of between 2 feet and 4 feet. The tube assembly also includes a horizontal tube 40. The horizontal tube has an interior end 42. The interior end of the horizontal tube is permanently attached to the upper end of the vertical tube. The horizontal tube has a free exterior end 44. The interior end and the exterior end of the horizontal tube are spaced by a distance of between 6 inches and 12 inches. In this manner a handle is formed. The horizontal tube is positioned to overlie the support plate. The interior end is positioned above the rear edge. The free exterior end is positioned closer to the front edge than the rear edge.

The positioning of the tubes, particularly the horizontal tube, is correlated with respect to the support plate. The positioning of the horizontal tube laterally between the sides of the support plate provides for maximum lateral balance when lifting. The positioning of the entire horizontal tube over the support plate with the free exterior end closer to the front edge than to the rear edge will tend to position a user's hand longitudinally over the longitudinal center of the support plate for maximum longitudinal balance when lifting. In this manner total balance is provided when lifting the system, lifting thus requiring reduced force by the user. Such balance is achieved while allowing total access by the user and the pets to the bowls from the front without interference from any vertical tube or similar component.

In addition to optimum balance, the horizontal tube is positioned for causing the support plate, with the supported water and food bowls, to function as a pendulum with the horizontal tube and user's hand as the point about which the pendulum rotates. As a result, the bowls of water and food will always remain parallel with the floor abating spillage during movement including raising and lowering. Such pendulum action and optimized handling are achieved while allowing total access by the user and the pets to the bowls from the front without interference from any vertical tube or similar component.

Provided next is a pair of similarly configured circular bowls 48, 50. The pair of bowls include a first bowl 48. The first bowl is adapted to hold water. The pair of bowls includes a second bowl 50. The second bowl is adapted to hold food. Each bowl is removably positioned on the upper surface of the support plate. Each bowl is provided in contact with the front wall and the rear wall and one of the side walls.

Further provided is a designer plate 52. The designer plate extends upwardly from the rear wall and in contact with a portion of the vertical tube. The designer plate has peripheral contours and artistic markings. The designer plate is adapted to simulate the appearance of an animal. The animal is adapted to eat and drink from the system.

Provided last is an elastomeric grip 56. The grip is removably positioned on the horizontal tube. In this manner the handling of the tube assembly and the system by a user is facilitated.

Reference is now made to the alternate embodiment 100 of the invention as illustrated in FIGS. 5 and 6. A front wall 104 is provided. Side walls 106 are provided. The side walls are curved. A generally rectangularly shaped feeding device 108 is provided. The feeding device has a generally square water supporting section 110. The feeding device has a generally square food supporting section 112. The feeding device is positionable on the upper surface of the support plate. The feeding device is provided in contact with the front wall and the rear wall and the side plates.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pet accommodating system comprising:
   a support plate with upper and lower surfaces, the support plate having rear and front edges and opposed side edges, a front wall upturned at the front edge, opposed side walls upturned at the side edges, a rear wall upturned at the rear edge, the support plate having arcuate cut out sections extending from an end of the front wall to an adjacent one of the side walls
   a tube assembly including a hollow vertical tube having a lower end and an upper end, the tube assembly also including a horizontal tube with an interior end permanently attached to the upper end of the vertical tube and a free exterior end, the horizontal tube being positioned to overlie the support plate with the exterior end being closer to the front edge than to the rear edge; and
   at least one circular bowl having an upper region and a lower region, the lower region of the at least one circular bowl being removably positioned on the upper surface of the support plate, the lower region of the at least one circular bowl being in contact with the front wall and the rear wall and one of the side walls.

2. A pet accommodating system comprising:
   a support plate with upper and lower surfaces, the support plate having rear and front edges and opposed side edges, a front wall upturned at the front edge, opposed side walls upturned at the side edges, a rear wall upturned at the rear edge, the support plate having arcuate cut out sections extending from an end of the front wall to an adjacent one of the side walls
   a tube assembly including a hollow vertical tube having a lower end and an upper end, the tube assembly also including a horizontal tube with an interior end permanently attached to the upper end of the vertical tube and a free exterior end, the horizontal tube being positioned to overlie the support plate with the exterior end being closer to the front edge than to the rear edge, and further including a generally rectangularly shaped feeding device (108) with an upper region and a lower region and with a generally square water supporting section (110) and a generally square food supporting section (112), the lower region of the feeding device being positionable on the upper surface of the support plate, the lower region of the feeding device being in contact with the front wall and the rear wall and the side walls.

3. A pet accommodating system (10) for allowing people with reduced physical capabilities to provide food and water to a pet in a safe, convenient and economical manner comprising, in combination:
   a support plate (14) in a generally planar configuration with an upper surface (16) and a lower surface (18), the support plate having a rear edge (20) and a front edge (22) separated by a depth including a maximum depth, the support plate having opposed side edges (24) separated by a width including a maximum width, the front and side edges being in a curved configuration, the maximum depth being between 40 and 60 percent of the maximum width, a front wall (26) upturned at a central extent of the front edge, the front wall having a width between 23 and 43 percent of the width of the support plate, opposed side walls (28) upturned at each side edge, each side wall having a depth between 23 and 43 percent of the maximum depth of the support plate, a rear wall (30) upturned at a central extent of the rear edge, the rear wall having a width between 57 and 77 percent of the width of the support plate, the lower surface being positionable on a recipient surface, the upper surface adapted to receive and support removable components, the support plate having two similarly configured front arcuate cut out sections (32) and two similarly configured rear arcuate cut out sections (33), the two similarly configured front arcuate cut out sections being concave and extending from an end of the front wall to an adjacent one of the side walls, each rearward cut out section being concave and extending from an end of the rear wall to an adjacent side wall, each cut out section having a radius of curvature equal to between 28 and 38 percent of the maximum depth, a tube assembly (36) including a hollow vertical tube (38) having a lower end and an upper end spaced by a height of between 2 feet and 4 feet, the tube assembly also including a horizontal tube (40) with an interior end (42) permanently attached to the upper end of the vertical tube and a free exterior end (44), the interior end and the exterior end being spaced by a distance of between 6 inches and 12 inches and forming a handle, the horizontal tube being positioned to overlie the support plate with the interior end above the rear edge and with the free exterior end being closer to the front edge than the rear edge, the positioning of the horizontal tube being correlated with respect to the support plate for providing balance and optimized handling when lifting the system;

a pair of similarly configured circular bowls (48), (50), a first bowl 48 adapted to hold water and a second bowl (50) adapted to hold food, each bowl being removably positioned on the upper surface of the support plate, each bowl being in contact with the front wall and the rear wall and one of the side walls;

a designer plate (52) extending upwardly from the rear wall and in contact with a portion of the vertical tube, the designer plate having peripheral contours and artistic markings adapted to simulate the appearance of an animal adapted to eat and drink from the system; and an elastomeric grip (56) removably positioned on the horizontal tube to facilitate the handling of the tube assembly and the system by a user.

\* \* \* \* \*